United States Patent [19]

Rhodes, Jr. et al.

[11] Patent Number: 4,931,989

[45] Date of Patent: * Jun. 5, 1990

[54] MICROWORD GENERATION MECHANISM UTILIZING A SEPARATE PROGRAMMABLE LOGIC ARRAY FOR FIRST MICROWORDS

[75] Inventors: Joseph C. Rhodes, Jr., Boca Raton; Victor S. Moore, Pompano Beach; Wayne R. Kraft, Coral Springs; John W. Barrs, Hialeah, all of Fla.

[73] Assignee: International Business Machines Corporation, Armonk, N.Y.

[*] Notice: The portion of the term of this patent subsequent to Aug. 4, 2004 has been disclaimed.

[21] Appl. No.: 38,556

[22] Filed: Apr. 15, 1987

Related U.S. Application Data

[62] Division of Ser. No. 350,663, Feb. 22, 1982.

[51] Int. Cl.$^5$ .............................................. G06F 9/28
[52] U.S. Cl. ................................ 364/900; 364/946.6; 364/946.2; 364/965
[58] Field of Search ... 364/200 MS File, 900 MS File

[56] References Cited

U.S. PATENT DOCUMENTS

| | | | |
|---|---|---|---|
| 3,760,369 | 9/1973 | Kemp | 364/200 |
| 3,800,293 | 3/1974 | Enger et al. | 364/200 |
| 3,949,370 | 4/1976 | Reyling, Jr. et al. | 364/200 |
| 3,959,774 | 5/1976 | Mead | 364/200 |
| 4,075,687 | 2/1978 | Nissen et al. | 364/200 |
| 4,104,720 | 8/1978 | Gruner | 364/200 |
| 4,156,925 | 5/1979 | Tutt et al. | 364/200 |
| 4,173,041 | 10/1979 | Dvorak et al. | 364/200 |
| 4,307,445 | 12/1981 | Tredennick et al. | 364/200 |
| 4,325,121 | 4/1982 | Gunter et al. | 364/200 |
| 4,338,661 | 7/1982 | Tredennick et al. | 364/200 |
| 4,354,228 | 10/1982 | Moore et al. | 364/200 |
| 4,367,524 | 1/1983 | Budde et al. | 364/200 |
| 4,370,709 | 1/1983 | Fosdick | 364/200 |
| 4,384,324 | 5/1983 | Kim et al. | 364/200 |
| 4,394,736 | 7/1983 | Bernstein et al. | 364/200 |
| 4,399,505 | 8/1983 | Druke et al. | 364/200 |
| 4,415,969 | 11/1983 | Bayliss et al. | 364/200 |
| 4,482,953 | 11/1984 | Burke | 364/200 |
| 4,513,174 | 4/1985 | Herman | 364/200 |
| 4,649,470 | 3/1987 | Bernstein et al. | 364/200 |

FOREIGN PATENT DOCUMENTS 1139001 4/1983 Canada.
1192368 5/1970 United Kingdom.

OTHER PUBLICATIONS

IEEE Journal of Solid-State Circuit S., vol. SC-14, No. 5, Oct. 1979, pp. 833-840.

Primary Examiner—Gareth D. Shaw
Assistant Examiner—Kevin A. Kriess

[57] ABSTRACT

A microword generation mechanism is provided for producing the sequences of microwords used to control the execution of processor instructions in a microprogrammed digital data processor. This microword generation mechanism includes a first programmable logic array mechanism responsive to the processor instruction to be executed for providing the first microword needed in the execution of such instruction. This microword generation mechanism also includes a second programmable logic array mechanism responsive to the processor instruction to be executed for providing the second microword needed in the execution of such instruction. This microword generation mechanism further includes at least one additional programmable logic array mechanism responsive to the processor instruction to be executed for providing the remainder of the microwords needed to execute such instruction.

6 Claims, 4 Drawing Sheets

FIRST CYCLE MICROWORDS

| INSTRUCTION GROUP | PLA STROBE | PC TO CIAR | IR TO A REG. | K TO B REG. | LS TO LSDR | PRECHG. BUS |
|---|---|---|---|---|---|---|
| GROUP I | X | X | X | | | |
| GROUP II | X | X | | X | | |
| GROUP III | X | X | | | X | X |

FIG. 4

SECOND CYCLE MICROWORDS

| INSTRUCTION GROUP | PLA STROBE | SET ALU | IR TO A REG. | K TO B REG. | LSDR TO A REG. | LSDR TO B REG. | PRECHG. BUS | INCRE. PC |
|---|---|---|---|---|---|---|---|---|
| GROUP I | X | X | X | | | | | |
| GROUP II | X | X | | X | | | | |
| GROUP III | X | X | | | X | | | |
| GROUP IV | X | X | | | | X | | |
| GROUP V | X | X | | | | | X | |
| GROUP VI | X | X | | | | | X | X |

FIG. 5

MICROWORD GENERATION MECHANISM UTILIZING A SEPARATE PROGRAMMABLE LOGIC ARRAY FOR FIRST MICROWORDS

This application is a division of application Ser. No. 06/350,663, filed Feb. 22, 1982.

CROSS-REFERENCE TO RELATED APPLICATIONS

The present patent application is related to the following copending patent applications:

(1) Application Ser. No. 350,660, filed 2/22, 1982, entitled "Microword Control System Utilizing Multiplexed Programmable Logic Arrays", the inventors being Victor S. Moore et al;

(2) Application Ser. No. 350,662, filed 2/22, 1982, entitled "Microword Control Mechanism Utilizing A Programmable Logic Array And A Sequence Counter", the inventors being Joel C. Leininger et al;

(3) Application Ser. No. 334,185, filed Dec. 28, 1981, entitled "Large Scale Integration Data Processor Signal Transfer Mechanism", the inventors being Virgil D. Wyatt et al;

(4) Application Ser. No. 350,683, filed 2/22, 1982, entitled "Clocking Mechanism For Multiple Overlapped Dynamic Programmable Logic Arrays Used In A Digital Control Unit," the inventors being Gerard A. Veneski et al;

(5) Application Ser. No. 350,682, filed 2/22, 1982, entitled "Microcode Control Mechanism Utilizing Programmable Microcode Repeat Counter", the inventors being Tony E. Parker et al; and (6) Application Ser. No. 350,681, filed 2/22, 1982, entitled "Integrated Circuit Mechanism For Coupling Multiple Programmable Logic Arrays To A Common Bus", the inventors being Wayne R. Kraft et al.

The descriptions set forth in these copending applications are hereby incorporated in the present application by this reference thereto.

TECHNICAL FIELD

This invention relates to microword generation mechanisms for use in microprogrammed data processors and digital computers wherein a sequence of microwords are used to control the execution of each processor instruction. This invention is particularly useful in data processors and digital computers wherein the principal circuit sections are formed on large scale integration (LSI) integrated circuit chips.

BACKGROUND ART

In a microprogrammed digital computer or data processor, microwords are read from an internal storage unit to provide the internal processor control actions which are needed to execute the processor instructions obtained from the user's software program. The microwords are read from the storage unit and set into a control register one at a time. Each microword consists of multiple binary bits, some or all of which may be organized into plural-bit control groups or control fields. The control register drives a decoder mechanism which produces the elemental control point signals which, in turn, control the various data flow gates and data manipulation mechanisms located in the data processor. Each microword controls the internal operation of the data processor for one microword cycle. Several microwords are normally needed to execute a processor instruction. Some processor instructions require only a few microwords, while others require many microwords to complete their execution.

A good example of a microprogrammed data processor is described in U.S. Pat. No. 4,173,041, issued on Oct. 30, 1979, to T. J. Dvorak et al. As indicated in this Dvorak et al patent, the microwords may be located in a separate storage unit called a "control storage" or they may be located in a portion of the processor main storage unit which is set aside for the exclusive use of the microwords. For the case of separate storage units, these units may be of either the read/write type or of the read only type. In smaller data processors, the current trend is to store the microwords in a so-called read only storage (ROS) unit. In any event, the microword storage units currently used are of the random access type and include the customary addressing circuitry for addressing any desired one of the storage locations in the storage unit.

The current trend is to fabricate the principal circuit sections, including the microword control storage section, of a data processor on large scale integration (LSI) integrated circuit chips. The overall objective is to increase the number of data processing functions that can be provided on a single integrated circuit chip, with the ultimate goal of providing a complete data processor or digital computer on a single chip. Currently, the best technology for packing the largest number of circuits onto a single chip is the so-called metal oxide semiconductor field effect transistor (MOSFET) technology. Such technology makes possible a very high circuit density on an integrated circuit chip. Unfortunately, MOSFET circuits have a somewhat slower operating speed than do circuits fabricated by means of other integrated circuit technologies, such as, for example, the so-called bipolar integrated circuit technology. Thus, it would be desirable to find ways to increase the operating speed of data processor mechanisms which employ MOSFET circuits. This is particularly true of the microword control storage section of the data processor because this section provides the elemental control signals for the remainder of the data processor.

SUMMARY OF INVENTION

This invention provides an improved microword generation mechanism which can be readily fabricated in MOSFET circuit technology and which will provide considerably faster operating speeds than are provided by currently available MOSFET microword generation mechanisms of equivalent size (total microword bit capacity). This is accomplished by providing a microword generation mechanism wherein the customary random access control storage unit and its addressing circuitry are replaced by a plurality of programmable logic arrays (PLA's) operating in parallel. A first of these programmable logic arrays is responsive to an operation determining portion of each processor instruction to be executed for providing the first microword needed in the execution of each such instruction. The additional programmable logic arrays are responsive to other operation determining portions of each of the processor instructions and provide the remainder of the microwords needed to execute each such instruction.

Only a relatively small number of microwords are needed in the first microword programmable logic array (PLA) because only a very limited number of different types of control actions need be provided by the first microwords for the various processor instructions. In particular, the various processor instructions can be divided into groups wherein the first microword is the same for each instruction in the group. Thus, the number of different first cycle microwords which are needed is substantially smaller than the number of different instructions in the overall processor instruction set. For this reason, the first microword PLA is of relatively small size and hence has a relatively fast operating speed. Thus, the first microword for each processor instruction is produced relatively quickly. This allows more time for the other PLA's to produce the remainder of the microwords for each processor instruction. In other words, the other PLA's can be somewhat larger and somewhat slower because their microwords will not be needed before the completion of the first microword cycle.

The first microword PLA provides a bit of a headstart in the generation of the microword sequence for each processor instruction. This is particularly helpful for the case of branch and jump types of processor instructions because it gives the microword generation mechanism a faster reaction time whenever it has to make a fresh start on a new set of processor instructions. Since most user programs contain a goodly number of branch and jump instructions, this represents a considerable saving in overall processing time.

This concept can be further extended to the second microword needed for the execution of each processor instruction. A second PLA can be provided responsive to another operation determining portion of each processor instruction and generating only the second microword needed in the execution of each of the various processor instructions. In general, this second microword PLA will be somewhat larger and somewhat slower than the first microword PLA because a greater variety of different control actions will be required during the second microword cycles. Nevertheless, this second microword PLA will be smaller and faster than the additional PLA's which generate the remainder of the microwords following the second cycle microword. The use of the separate second microword PLA allows even more time for such additional PLA's to start outputting valid microwords. In other words, the additional PLA's do not have to start providing their microwords until after completion of the first two microword cycles for each processor instruction.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings.

Figure 1:
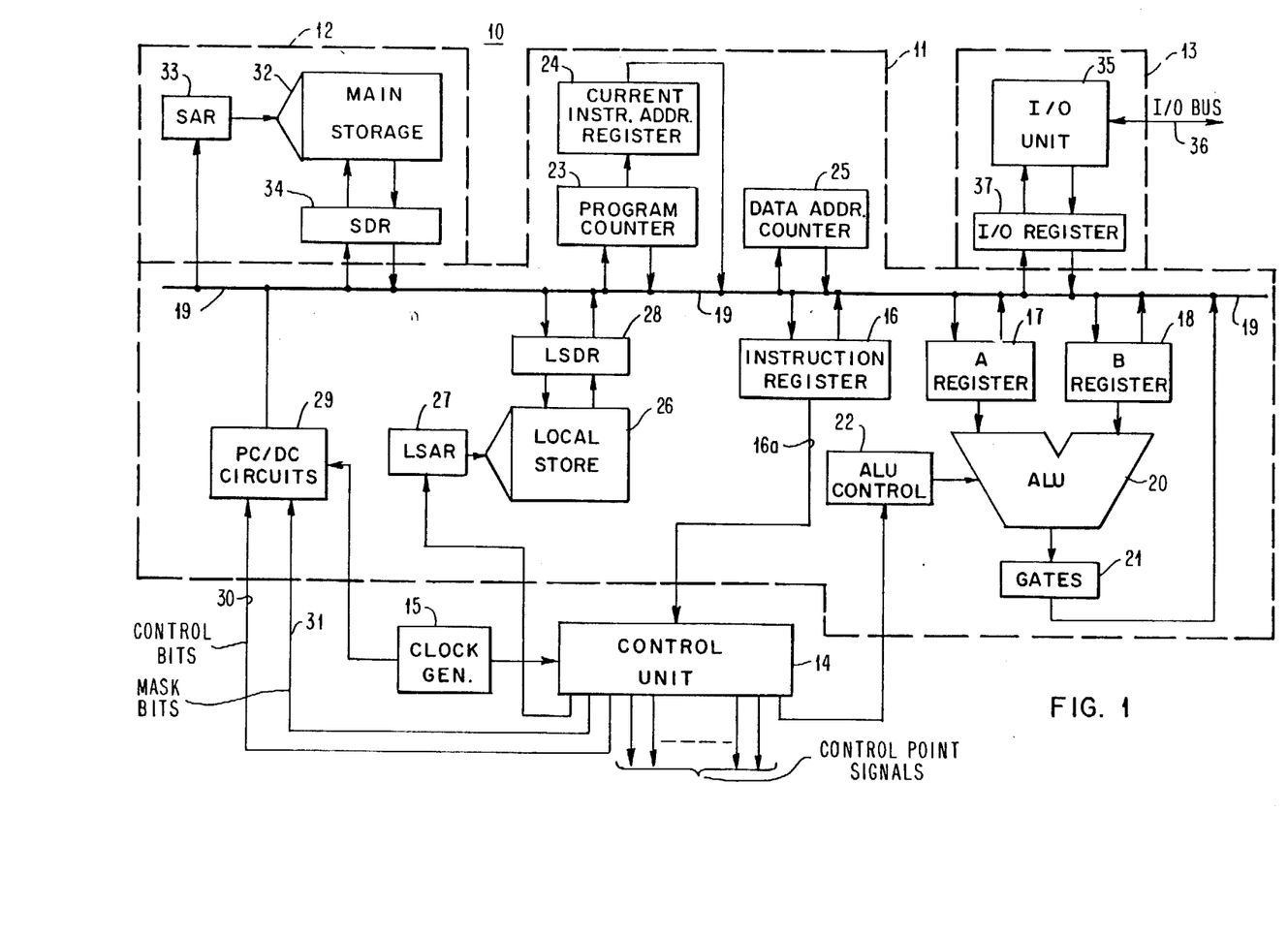
FIG. 1 is a functional block diagram of a digital data processor wherein the present invention may be used to advantage.

DESCRIPTION OF THE FIG. 1 DATA PROCESSOR

Referring to FIG. 1, there is shown a functional block diagram of a digital computer or data processor 10 which is particularly suitable for fabrication on large scale integration (LSI) type integrated circuit chips. This data processor 10 includes a data flow unit 11, a main storage unit 12, an input/output (I/O) unit 13, a control unit 14 and a clock generator 15. The data flow unit 11 is sometimes called a central processing unit (CPU) and includes such things as an arithmetic and logic unit (ALU), various hardware registers and counters, a local storage unit and a bus system interconnecting these items with one another. The data flow unit 11 is the unit that does the adding, subtracting, rearranging and other manipulations of the data to produce the desired results. The control unit 14 controls the operation of the data flow unit 11, the main storage unit 12 and the I/O unit 13 by way of various control point signals which are supplied to the various circuit mechanisms located in these units. Control unit 14 includes a microword generation mechanism for producing a sequence of microwords for each processor instruction to be executed. These microwords, in turn, produce the control point signals which control the elemental operations in the other data processor units.

The data flow unit 11 includes an instruction register 16, an A register 17 and a B register 18, each of which has both its input circuitry and its output circuitry coupled to a multiconductor processor bus 19 for supplying plural-bit binary signals thereto and receiving plural-bit binary signals therefrom. The A and B registers 17 and 18 drive an arithmetic and logic unit (ALU) 20, the output of which is coupled to the processor bus 19 by way of a set of gate circuits 21. An ALU control circuit 22 is responsive to control point signals from the control unit 14 for setting the particular arithmetic or logical operation to be performed by the ALU 20. The data flow unit 11 further includes a program counter 23, a current instruction address register 24 and a data address counter 25, which are coupled to the processor bus 19 for providing storage addresses for the main storage unit 12.

The data flow unit 11 also includes a local storage unit 26 having associated therewith a local storage address register (LSAR) 27 and a local storage data register (LSDR) 28. LSDR 28 is coupled to the processor bus 19 for use in transferring plural-bit binary data from the processor bus 19 to the local storage unit 26 and vice versa. Local storage unit 26 includes various general purpose registers for temporarily storing data and the like during the performance of the user program being performed by the data processor 10. For simplicity of explanation, LSAR 27 is assumed to receive local storage addresses from the control unit 14.

The data flow unit 11 further includes a set of precharge/discharge (PC/DC) circuits 29 for use in selectively precharging and discharging the individual conductors or lines in the processor bus 19. This precharge/discharge circuitry 29 receives certain control bits and mask bits from the control unit 14 by way of control point signal buses 30 and 31, respectively. The coding of the control bits determines whether charging, discharging or both charging and discharging operations are to be performed and the mask bits determine which processor bus line are to be affected.

Precharge/discharge circuits 29 are described in greater detail in the above-referenced related application Ser. No. 334,185 for Wyatt et al. As there described, the preferred method of transferring data from one register to another via the processor bus 19 is to initially precharge all of the lines of the processor bus 19. Thereafter, the selected source register is caused to selectively discharge those bus lines which are to have a logical one value. The undischarged bus lines represents logical zero values. The appropriate destination register is caused to take in the complete binary data pattern appearing on the processor bus 19.

The main storage unit 12 includes a main storage mechanism 32, a storage address register (SAR) 33 and a storage data register (SDR) 34. SAR 33 is coupled to the processor bus 19 for receiving storage addresses from the program counter 23 and the data address counter 25. SDR 34 is also coupled to the processor bus 19 for transferring data, instructions and the like from the main storage mechanism 32 to the processor bus 19 or vice versa.

The I/O unit 13 includes an I/O unit 35 which is coupled to an I/O bus 36 which runs to various peripheral units associated with the data processor 10. I/O unit 35 is coupled to the processor bus 19 by way of an I/O register 37. I/O register 37 is used to transfer plural-bit binary information from the I/O unit 35 to the processor bus 19 and vice versa.

The user program to be performed by the data processor 10 is initially loaded into the main storage unit 32 from one of the peripheral units coupled to the I/O bus 36. This is accomplished by way of the I/O unit 35, the I/O register 37, the processor bus 19 and the storage data register 34. Thereafter, the user program is performed by reading from the main storage unit 32 in a sequential manner the various processor instructions which make up the user program. Each processor instruction, in its turn, is transferred by way of SDR 34 and the processor bus 19 to the instruction register 16. The processor instruction residing in the instruction register 16, or at least the effective operation code portion thereof, is supplied to the control unit 14 by way of a multiline bus 16a to identify to the control unit 14 the particular processor instruction to be executed.

In response to each processor instruction resident in the instruction register 16, the microword generation mechanism in the control unit 14 produces for each such processor instruction a sequence of microwords. A decoder mechanism in the control unit 14 is responsive one at a time to the microwords for producing for each microword a plurality of control point signals. Some of these control point signals control the loading of data into and the gating of data out from the various registers, counters and other units in the data processor 10. For simplicity of illustration, the various input loading and output gating control point lines are not shown in FIG. 1. Other of the control point signals provide the addresses for the local storage address register 27 and the control signals for the ALU control 22 and the precharge/discharge circuits 29.

Figure 2:
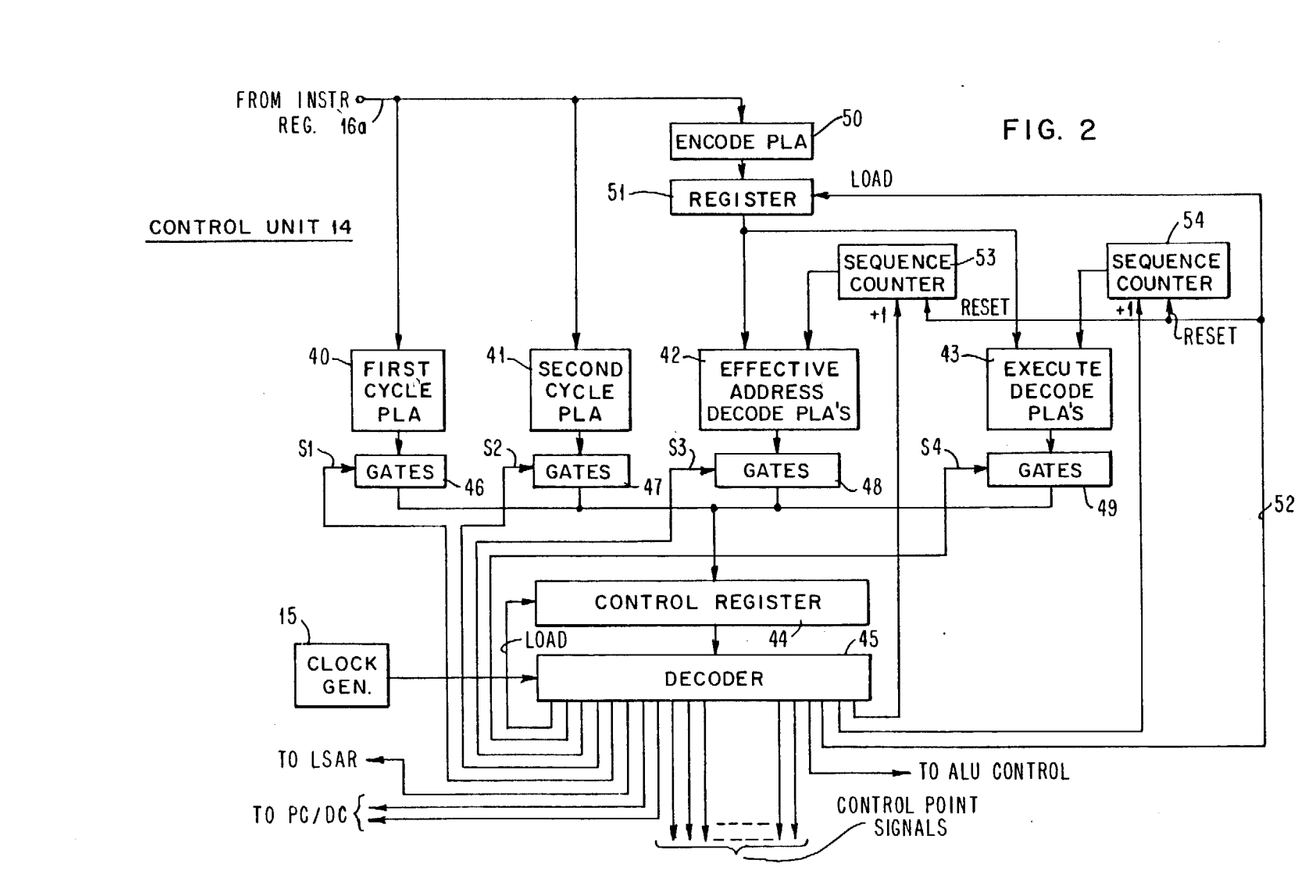
FIG. 2 is a functional block diagram of a data processor control unit which includes a microword generation mechanism constructed in accordance with the present invention.

Description of the FIG. 2 Control Unit Embodiment

Referring now to FIG. 2 of the drawings, there is shown in greater detail a representative form of construction for the control unit 14 of FIG. 1. This construction includes a first embodiment of an improved microword generation mechanism constructed in accordance with the present invention. This improved microword generation mechanism includes a plurality of programmable logic array (PLA) mechanisms represented by a first cycle PLA 40, a second cycle PLA 41, a set of effective address decode PLA's 42 and a set of execute decode PLA's 43. Each of these PLA's 40-43 is responsive to the processor instruction residing in the instruction register 16 for producing some of the microwords needed to execute such processor instruction.

The first and second cycle PLA's 40 and 41 respectively provide the first and second microwords needed to execute the instruction. The next several microwords are provided by the effective address decode PLA's 42. In general, the microwords provided by the effective address decode PLA's 42 serve to perform the effective address calculations for the operand or operands to be manipulated and to fetch such operands from the main storage unit 32. After completion of the effective address calculation microwords, the remainder of the microwords needed to execute the processor instruction are provided by the execute decode PLA's 43. These microwords "execute" the processor instruction that is, they perform the desired operand manipulation or manipulations called for by the processor instruction. After completion of the operand manipulations, the execute PLA's 43 also provide any further microwords that may be needed to complete the overall microword sequence for that particular processor instruction.

For sake of example only, each of the effective address decode PLA mechanism 42 and the execute decode PLA mechanism 43 is assumed to include a set of four PLA's which are operated in parallel with one another. These PLA's provide microwords in a repeating 1-2-3-4 sequence until the desired number of microwords have been provided.

The microwords from the various PLA's 40–43 are supplied one at a time to a control register 44. Each microword, when resident in the control register 44, drives a decoder 45 which, in response thereto, produces the appropriate control point signals for a single microword control cycle. Each microword contains a relatively large number of bits which are grouped to provide several plural-bit control fields. Some of these control fields are encoded control fields. These encoded control fields are decoded by the decoder 45 to produce the appropriate individual control point signals. Other control fields are non-encoded or bit-significant control fields. The bit positions in these non-encoded control fields are supplied straight through by the decoder 45 to the appropriate output control point lies. The clock generator 15 supplies the clock pulses which determine the points in time at which the control point signals actually appear at the output of the decoder 45. In some data processors, there is one clock pulse per microword cycle, while in other processors there are a group of time spaced clock pulses for each microword cycle.

Selection of the particular microword to be loaded into the control register 44 is accomplished by means of PLA output gates 46–49 and by means of PLA output strobe pulses S1-S4 which are produced by the microwords themselves. In particular, each microword resident in the control register 44 produces a PLA strobe pulse which selects the PLA which is to provide the next microword for the control register 44. There are as many different PLA strobe control point lines from the decoder 45 as there are PLA's which supply microwords to the control register 44, the different ones of these PLA strobe control point lines running to the different ones of the PLA output gates. One of the control fields in each microword is a PLA strobe control field. For each microword, this PLA strobe control field is coded to activate a particular one of the PLA strobe control point lines to enable the output gates for a particular PLA to pass a microword from that PLA to the control register 44.

In this manner, the microword from first cycle PLA 40, when resident in control register 44, causes the decoder 45 to produce a PLA strobe pulse S2 which enables gates 47 to pass a microword from the second cycle PLA 41 to the control register 44. The microword from the second cycle PLA 41, when resident in the control register 44, causes the decoder 45 to produce a PLA strobe pulse S3a which enables a microword from a first of the effective address decode PLA's to be supplied to the control register 44. In a similar manner, the microword from the first effective address decode PLA produces a PLA strobe pulse S3b which selects a microword from the second effective address decode PLA and so forth. The last microword from the execute decode PLA's 43 produces a PLA strobe pulse S1 which enables another microword from the first cycle PLA 40 to be supplied to the control register 44. In this manner, each microword resident in the control register 44 is effective to select the source of the next microword to be supplied to the control register 44.

Each of the first cycle PLA 40, the second cycle PLA 41, the effective address decode PLA's 42 and the execute decode PLA's 43 includes an input AND array connected by a goodly number of product lines to an output OR array. In the present embodiment, each of these PLA's is a "static" PLA. A later embodiment will describe the case where "dynamic" PLA's are used.

For the first cycle PLA 40, the instruction bits from the instruction register 16 are supplied via bus 16a directly to the input lines for the AND array portion of the PLA. In response to a particular coding of the instruction bits, the AND array activates a particular product line. Activation of a particular product line causes the OR array portion of the PLA to produce on its OR array output lines a particular microword bit pattern. The OR array output lines are connected to the inputs of the gates 46. Each product line portion of the OR array for the PLA 40 is personalized to provide a different microword. The AND array portion of the PLA 40 is personalized so that the different instruction bit codes for the different processor instructions will activate the proper product lines. For the case of the first cycle PLA 40, only a relatively small number of microwords are needed because the different processor instructions can be grouped into groups wherein one and the same microword can be used for each instruction in the group.

The second cycle PLA 41 is constructed and connected in a corresponding manner to provide a second microword for the various processor instructions. In general, the second cycle PLA 41 will include a somewhat larger number of microwords than the first cycle PLA 40. Nevertheless, the number of different microwords in the second cycle PLA 41 will remain substantially less than the total number of different processor instructions in the processor instruction set.

The microwords for the remaining microword cycles after the first and second cycles for each processor instruction are obtained from the effective address decode PLA's 42 and the execute decode PLA's 43. To this end, the processor instruction bits from the instruction register 16 are supplied to the input AND array of an encode PLA 50. In response thereto, the output OR array of the encode PLA 50 outputs an instruction identification (ID) number which uniquely identifies the processor instruction being supplied to the input of the encode PLA 50. This instruction ID number has a lesser number of bits than there are processor instruction bits supplied to the input of the encode PLA 50. This reduces the number of AND array input lines required in each of the decode PLA's 42 and 43. In the present embodiment, the encode PLA 50 is a static PLA and is of relatively small size compared to the effective address and execute decode PLA's 42 and 43.

Near the end of the microword sequence for the previous processor instruction, the instruction ID number for the new processor instruction is loaded into a plural-stage register 51 by an appropriate control point signal from the decoder 45. This control point signal appears on control point line 52 and is also supplied to the reset terminals of sequence counters 53 and 54 to reset each of these counters to a zero count condition.

The plural-bit instruction ID number from the register 51 is supplied to a first set of inputs of the AND array section of each of the effective address decode PLA's 42. The plural-bit sequence count number from the sequence counter 53 is supplied to a second set of inputs of the AND array section of each of the effective address decode PLA's 42. These combined inputs, the instruction ID number and the sequence count number, cause each of the effective address decode PLA's to select and output a particular microword. These microwords are supplied one at a time to the control register 44. As the last microword is supplied to the control register 44, the sequence counter 53 is incremented by a count of one to supply another sequence count number to the effective address decode PLA's 42. This causes each of the effective address decode PLA's 42 to select and output another microword. These other microwords are supplied one at a time to control register 44 and the sequence counter 53 is again incremented to supply a further sequence number to the inputs of the effective address decode PLA's 42. This process is repeated over and over again, as necessary, until the desired number of effective address decode microwords have been produced for the processor instruction being executed.

The execute decode PLA's 43 operate in a similar manner to produce the remainder of the microwords needed to complete the execution of the current processor instruction. The last microword loaded into the control register 44 from the effective address decode PLA's 42 produces the appropriate PLA output strobe on the strobe bus S4 to commence selection of the microwords from the execute decode PLA's 43. Thereafter, each microword from the execute decode PLA's 43 serves to select the next execute decode microword to be supplied to the control register 44, the final execute decode microword serving to produce the appropriate PLA strobe to select the output from the first cycle PLA 40 to commence the microword sequence for the next processor instruction. The sequence counter 54 for the execute decode PLA's 43 is incremented once for each set of microwords provided by the execute decode PLA's 43.

In addition to executing the current processor instruction, the microword sequence for the current processor instruction also fetches the next processor instruction from the main storage unit 32 and loads it into the instruction register 16. This is accomplished by incrementing the program counter 23 and supplying the incremented program count to the storage address register 33 to access the next processor instruction from the main storage unit 32. The loading of the next processor instruction into the instruction register 16 is done at a point in time where it will not affect the completion of the execution of the current processor instruction. In particular, it is done after the first and second cycle PLA's 40 and 41 have supplied their microwords for the current instruction and after the instruction ID number for the current instruction has been loaded into the register 51.

Operation of the FIG. 2 Control Unit Embodiment

The first and second cycle PLA's 40 and 41 are each of relatively small size and hence have relatively fast operating speeds. In particular, the first cycle PLA 40 is sufficiently small and sufficiently fast so that it can produce a valid output microword within 50 nanoseconds after receiving a new set of processor instruction bits from the instruction register 16. This enables the construction of a control unit wherein each microword control cycle has a duration of, for example, 50 nanoseconds. The second cycle PLA 41, on the other hand, can be somewhat larger and somewhat slower than the first cycle PLA 40. This is because the 50 nanoseconds which is allotted to the first cycle PLA 40 gives the second cycle PLA 41 an additional 50 microseconds to produce a valid output microword. Thus, the requirement on the second cycle PLA 41 is that it produce a valid output microword within 100 nanoseconds after receiving the new instruction bits from the instruction register 16.

The use of the separate first and second cycle PLA's 40 and 41 gives the effective address decode PLA's 42 an additional 100 nanoseconds in which to start producing valid output microwords. In other words, the effective address decode PLA's 42 have up to 150 nanoseconds in which to provide the first valid effective address microword. This gives the time needed for the encode PLA 50 to produce the instruction ID number, the register 51 to receive such number and pass it on to the effective address decode PLA's 42 and for the effective address decode PLA's 42 to respond to such ID number and produce the first effective address microword.

For some types of processor instructions, there is plenty of time to load the instruction register 16 with a new instruction and to prime the first and second cycle PLA's 40 and 41 and the encode PLA 50 well in advance of the time their valid outputs will be needed for the next instruction. This, however, is not the case for so-called branch instructions and so-called jump instructions. If the branch or jump conditions are met, a new "out of sequence" processor instruction must be quickly loaded into the instruction register 16 and its execution commenced as soon as possible. The fast reaction times and the headstart provided by the first and second cycle PLA's 40 and 41 make this possible. In other words, the first and second cycle PLA's 40 and 41 considerably speed up the performance of branch type and jump type processor instructions. Since a typical user program will be doing branch and jump instructions as much as 60% of the time, this represents a substantial improvement in the performance of the data processor.

The reason the first and second cycle PLA's 40 and 41 can be relatively small and fast is that only relatively small numbers of different microwords are needed for the first and second microword control cycles for the various processor instructions. In other words, the various processor instructions making up the complete processor instruction set can be divided into a first set of groups wherein the first cycle microword is the same for each instruction in the group. In a similar manner, the various processor instructions can also be divided into a second set of groups wherein the second microword is the same for each instruction in the group. Thus, each of the first and second cycle PLA's 40 and 41 need recognize only the general class or group to which a particular processor instruction belongs. It need not recognize or respond to all the specifics of each instruction.

Figure 3:
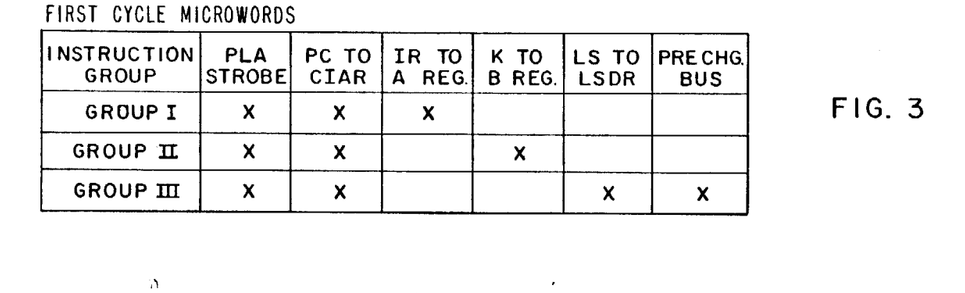
FIGS. 3 and 4 are charts used in explaining the operation of the FIG. 2 control unit.

The table of FIG. 3 gives a more or less representative example of the limited number of different types of control actions needed during the first microword cycles for the various processor instructions. In this example, the processor instruction set is divided into three different groups or classes for first cycle microword purposes. In this case, only three different microwords need be provided by the first cycle PLA 40, a first microword being provided for the Group I instructions, a second microword being provided for the Group II instructions and a third microword being provided for the Group III instructions. As indicated by FIG. 3, each of these microwords produces a PLA output strobe for selecting the source of the next microword. Each of these microwords also produces a control point signal for loading into the current instruction address register 24 a replica of the program instruction address residing in the program counter 23. The current instruction address register 24 is useful for the case of plural-word processor instructions. In such case, the CIAR 24 is used to retain the storage address of the first word of the plural-word instruction. The program counter 23 is thereafter updated to address, in turn, the second, third, etc. words of the processor instruction. The first word of the plural-word instruction includes the effective operation code and is the word that is loaded into the instruction register 16. The additional word or words of a plural-word instruction provide immediate data values, operand address information and the like.

As indicated in FIG. 3, the first microword for each processor instruction in Group I serves to set into the A register 17 a replica of the instruction word residing in the instruction register 16. The first microword for the Group II instructions provides a different action. This Group II microword, instead, causes a constant (K) to be loaded into the B register 18. This plural-bit constant is produced by the precharge/discharge circuits 29 and is transferred to the B register 18 via the processor bus 19. The first microword for the processor instructions in Group III is effective to transfer the plural-bit binary value being output by the local store 26 into the local storage data register 28. This Group III first cycle microword is also effective to precharge all of the bus lines of the processor bus 19. This precharging is accomplished by the precharge/discharge circuits 29. As previously mentioned, this blanket precharging of the processor bus 19 is a first step that is employed in transferring a plural-bit binary value from one register to another by way of the processor bus 19.

Figure 4:
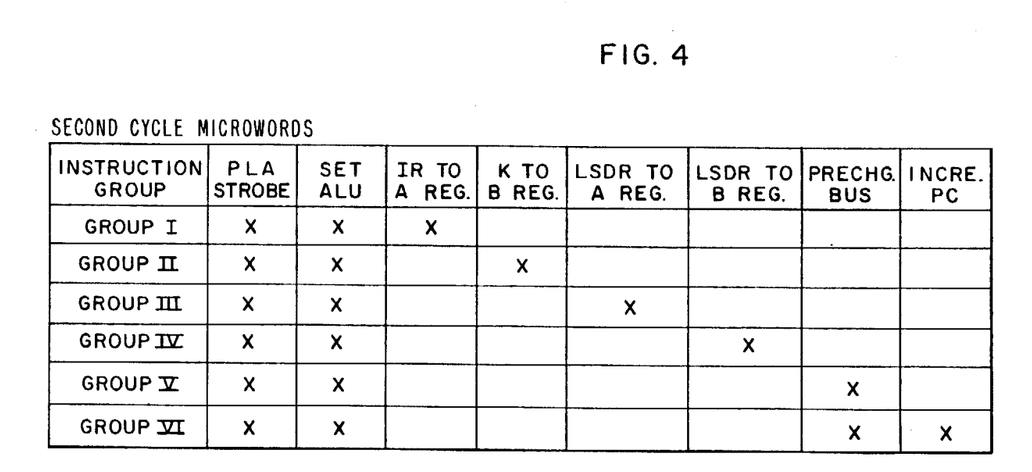

FIG. 4 shows the sets of control actions provided by the different second cycle microwords. In this example, the complete processor instruction set is divided into six groups and a different second cycle microword is provided for each of the six groups. Thus, for this example, the second cycle PLA 41 includes a total of six different microwords. As indicated in FIG. 4, each of these six second cycle microwords provides a PLA output strobe for selecting the next microword source. Each of these microwords also provides a plural-bit control signal for the ALU control 22. Such ALU control signal is coded to set the ALU 20 to provide a desired arithmetic or logical operation.

In addition to the foregoing, the second cycle microword for each processor instruction in Group I also serves to set into the A register 17 a replica of the instruction word residing in the instruction register 16. The Group II second cycle microword, on the other hand, serves to load a constant (K) into the B register 18, this constant being provided by the PC/DC circuits 29. The Group III microword serves to transfer the contents of the local store data register 28 to the A register 17. The Group IV microword serves to transfer the contents of the local store data register 28 to the B register 18. The Group V microword serves to precharge all of the bus lines of the processor bus 19. The Group VI microword, in addition to doing a blanket precharge of the processor bus 19, also serves to increment the program counter 23.

The particular control actions and control action groupings shown in FIGS. 3 and 4 are intended for purposes of example only. Different processor constructions will in general require different types and groupings of first and second microword cycle control actions. Also, the number of groups into which the processor instruction set may be divided for first and second microword cycle purposes may differ from one processor construction to another. Nevertheless, the general proposition that smaller numbers of microwords can suffice for the first and second microword cycles remains valid and the use of separate first and second cycle PLA's will provide an improvement in the performance of the data processor.

In addition to requiring lesser numbers of microwords, the first and second cycle PLA's 40 and 41 will also be smaller because each will require a lesser number of AND array input lines and a lesser number of OR array output lines. Fewer AND array input lines are required because the first and second cycle PLA's 40 and 41 need only determine to which class or group each instruction belongs. Thus, a lesser number of bits of the processor instruction need be supplied from the instruction register 16 to the first and second cycle PLA's 40 and 41 to recognize the class or group.

The numbers of OR array output lines required in the first and second cycle PLA's 40 and 41 will also generally be smaller because the first and second cycle microwords are not required to provide the complete range of microword control actions needed by the data processor. The first and second cycle PLA's 40 and 41 need only provide the limited number of control actions which are required for the first and second microword cycles of the various processor instructions.

Figure 5:
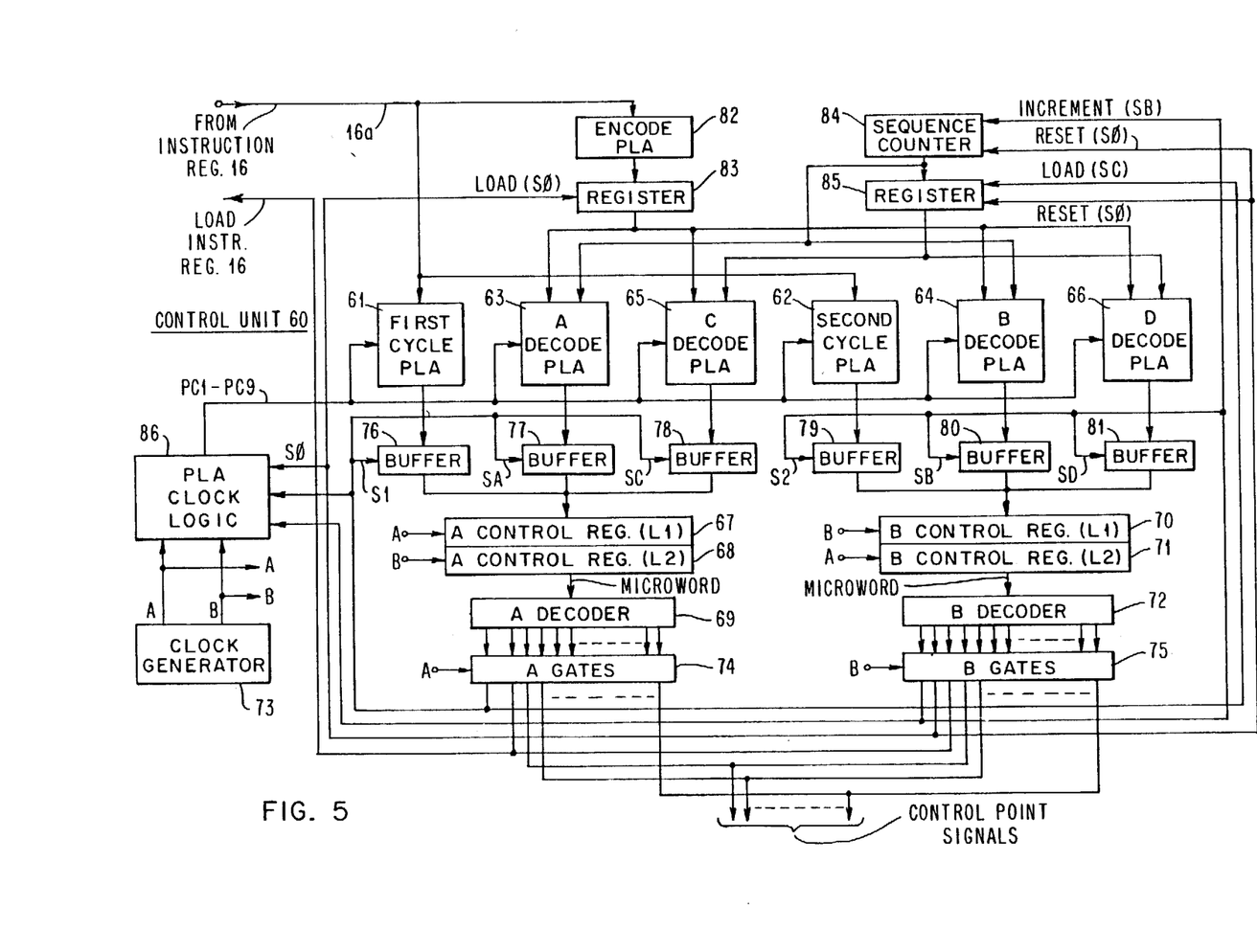
FIG. 5 is a functional block diagram of another embodiment of a microword generation mechanism constructed in accordance with the present invention.

Description of the FIG. 5 Control Unit Embodiment

Referring now to FIG. 5 of the drawings, there is shown in greater detail another form of construction for the control unit 14 of FIG. 1. This construction includes a second embodiment of an improved microword generation mechanism constructed in accordance with the present invention. This embodiment of FIG. 5 is described in considerable detail in the above-referenced related application Ser. No. 350,681 of Wayne R. Kraft et al. For this reason, only a summary description of the FIG. 5 embodiment will be given herein. Reference can be made to the copending application for further details.

FIG. 5 shows a control unit 60 wherein the microwords used to control the execution of each processor instruction are provided by programmable logic arrays (PLA's) 61-66. The first cycle PLA 61 corresponds to the first cycle PLA 40 of FIG. 2 and the second cycle PLA 62 corresponds to the second cycle PLA 41 of FIG. 2. In FIG. 5, separate sets of effective address decode PLA's and execute decode PLA's are not provided. Instead, both the effective address calculation functions and the execute functions are provided by a set of four PLA's represented by an A decode PLA 63, a B decode PLA 64, a C decode PLA 65 and a D decode PLA 66.

In FIG. 5, two sets of control registers and decoders are employed. An "A" set is represented by control registers 67 and 68 and a decoder 69. A "B" set is represented by control registers 70 and 71 and a decoder 72.

The control unit 60 is driven by a clock generator 73 which is used in place of the clock generator 15 of FIGS. 1 and 2. This clock generator 73 is a two-phase non-overlappinhg clock generator. It produces two sets of interleaved but non-overlapping clock pulses, one set being Set A and the other being Set B. Among other things, the A clock pulses periodically enable a set of A gates 74 and the B clock pulses periodically enable a set of B gates 75, such enablings being in an interleaved but non-overlapping manner. In this manner, the A decoder 69 and the B decoder 72 are caused to provide the control point signals in an alternating A-B-A-B-A-B manner. Many of the control point lines from the A decoder 69 are OR'ed with their counterparts from the B decoder 72 so that many of the units in the FIG. 1 data processor can receive their control point signals during either the A or the B clock phase.

The first three PLA's 61,63 and 65 supply their microwords one at a time to the A control register 67. Each, in turn, is passed to the A control register 68 to drive the A decoder 69 to produce the output control point signals which are passed by the A gates 74 during the A clock phase. In a similar but time interleaved manner, the last three PLA's 62,64 and 66 supply their microwords one at a time to the B control register 70 from whence they are transferred to the B control register 71 to drive the B decoder 72 to produce the control point signals which are passed by the B gates 75 during the B clock phase.

As in FIG. 2, each microword produces a PLA output strobe signal which selects the next PLA to provide the next microword to be supplied to the control register. In FIG. 5, the PLA strobes from the A decoder 69 select between the PLA's 61,63 and 65 to obtain the next microword for the A control register 67. The first cycle PLA 61 is selected to provide only the first microword needed for any given processor instruction. Thereafter, the microwords for the A control register 67 are alternately taken from the A and C decode PLA's 63 and 65. The PLA output strobes from the A decoder 69 are identified as S1,SA and SB and are individually supplied to the respective ones of PLA output buffers 76,77 and 78.

In a corresponding manner, the PLA output strobe S2, SB and SD produced by the B decoder 72 are used to select between the PLA's 62,64 and 66 to obtain the next microword for the B control register 70. These PLA strobes S2,SB and SD are individually supplied to the respective ones of the PLA output buffers 79, 80 and 81. The S2 PLA output strobe for the second cycle PLA 62 is activated only to provide the microword for the second microword cycle for a given processor instruction. After that, the remaining microwords are obtained in an alternate manner from the B and D decode PLA's 64 and 66.

The results of the foregoing multiplexing of the various microwords is to provide for each processor instruction a sequence of microwords obtained from the various PLA's 61–66 in the following order: 1,2,A,B,C,-D,A,B,C,D,A,B, . . . . The numbers and letters identify the source PLA. The first and second cycle PLA's 61 and 62 provide only the first and second microwords The remainder of the microwords for any given processor instruction are taken from the A,B,C and D decode PLA's in a sequential A-B-C-D manner, the exact number of additional microwords being whatever is needed to complete the execution of that particular processor instruction.

As before, the first and second cycle PLA's 61 and 62 receive processor instruction bits directly from the instruction register 16. The other PLA's 63–66, on the other hand, make use of an encode PLA 82 and a register 83. The encode PLA 82 converts the processor instruction residing in instruction register 16 into a unique instruction ID word having a lesser number of bits. This instruction ID number is supplied by way of the register 83 to a first set of inputs of each of the A,B,C and D decode PLA's 63,64,65 and 66, respectively. These A,B,C and D decode PLA's also make use of a sequence counter 84 and a counter buffer register 85. The sequence counts from counter 84 are supplied directly to a second set of inputs of the A and B decode PLA's and are supplied by way of register 85 to a second set of inputs of the C and D decode PLA's. The encode PLA output register 83 is loaded and the sequence counter 84 and the register 85 are reset to zero by the same control point signal pulse S$\phi$. The sequence counter 84 is incremented once for each set of A,B,C and D microwords by the PLA output strobe pulse SB. The buffer register 85 is reloaded once for each set A,B,C, and D microwords by the PLA output strobe pulse SC.

Each of the microword producing PLA's 61–66 is a so-called "dynamic" or clocked PLA. As such, each uses a set of four time-spaced clocking pulses C1,C2,C3 and C4 to produce a valid output bit pattern in response to a valid input bit pattern. The C1-C2-C3-C4 clock pulse sets for the successive ones of the PLA's 61–66 are offset relative to one another by one microword cycle so that the C1 pulse for the second PLA coincides with the C2 pulse for the first PLA, the C1 pulse for the third PLA coincides with the C2 pulse for the second PLA, etc. These C1-C4 PLA internal clocking pulses are obtained from PLA clock logic 86. This PLA clock logic 86 is driven by the S$\phi$ control point signal and the various PLA output strobes S1,S2,SA,SB,SC and SD. These S$\phi$–SD pulses contain the necessary and sufficient information to produce the different sets of C1–C4 internal clocking pulses required by the different ones of the PLA's 61–66. This is discussed in greater detail in the above-referenced related application Ser. No. 350,681 for Kraft et al.

As in the FIG. 2 embodiment, the first cycle PLA 61 and the second cycle PLA 62 are smaller and faster than the other microword producing PLA's 63–66. Each includes a lesser number of microwords than do the other four PLA's 63–66.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a microprogrammed data processor wherein a unique sequence of microwords are used to control the execution of each processor instruction, an improved microword generation mechanism comprising:

a first programmable logic array mechanism responsive to an operation determining portion of a processor instruction to be executed for providing the first microword of said unique sequence needed in the execution of such instruction;

and at least one additional programmable logic array mechanism operating in parallel with said first programmable logic array responsive to another operation determining portion of this same processor instruction to be executed for providing the remainder of the microwords of said unique sequence needed to execute such instruction.

2. An improved microword generation mechanism in accordance with claim 1 wherein there are a plurality of additional programmable logic array mechanisms operating in parallel with the first and second programmable logic arrays for providing the remainder of the microwords needed to execute each processor instruction.

3. An improved microword generation mechanism in accordance with claim 1 wherein the first programmable logic array mechanism is smaller and faster than the additional programmable logic array mechanism or mechanisms.

4. An improved microword generation mechanism in accordance with claim 1 wherein the first programmable logic array mechanism is responsive to a lesser number of bits in the processor instruction to be executed than is the additional programmable logic array mechanism or mechanisms.

5. An improved microword generation mechanism in accordance with claim 1 wherein:

the various processor instructions to be executed can be divided into groups of instructions wherein for each group of instructions the first microword is the same for each instruction in the group;

and the first programmable logic array mechanism is responsive to only those bits of each processor instruction to be executed which are needed to distinguish between the different groups of instructions.

6. An improved microword generation mechanism in accordance with claim 1 wherein the first programmable logic array mechanism has a lesser number of output lines than does the additional programmable logic array mechanism or mechanisms.

* * * * *